United States Patent [19]

Morel

[11] 4,381,585

[45] May 3, 1983

[54] SELF LOCKING CLAMPING COLLAR

[75] Inventor: Henri Morel, Maule, France

[73] Assignee: ITW de France, Beauchamp, France

[21] Appl. No.: 182,895

[22] Filed: Sep. 2, 1980

[30] Foreign Application Priority Data

Sep. 6, 1979 [FR] France .............................. 79 22333

[51] Int. Cl.³ ............................................ F16L 33/12
[52] U.S. Cl. .................................. 24/270; 24/69 AT
[58] Field of Search ................... 24/69 R, 69 AT, 270, 24/271, 273

[56] References Cited

U.S. PATENT DOCUMENTS

| | | | |
|---|---|---|---|
| 764,659 | 7/1904 | Coleman | 24/273 |
| 2,649,632 | 8/1953 | Kessler | 24/270 |
| 2,673,102 | 3/1954 | Hutchinson | 24/270 X |
| 3,305,234 | 2/1967 | Cline et al. | 24/270 X |

Primary Examiner—Robert P. Swiatek
Attorney, Agent, or Firm—Jerold M. Forsberg; Thomas W. Buckman

[57] ABSTRACT

A clamping self locking collar includes a split ring, an actuating lever, and a buckle. The lever engages one end of the clamping split ring and the buckle is associated with the other end of the ring. The lever coacts with the buckle in an overcenter manner to positively lock the clamping collar around an article of a predetermined size. The various elements of the collar are produced from a single injection moulding step and are kept together prior to assembly by the inclusion of frangible connections and flexible filaments. No tool is necessary for installation of the clamp or for ensuring safety and intensiveness of the clamping.

2 Claims, 4 Drawing Figures

SELF LOCKING CLAMPING COLLAR

There are various types of clamping collars. Some of them are self locking but in most cases clamps are used that require a tool, e.g., a pair of pliers or a screwdriver. Most self-locking clamping collars exert on the portion to be clamped a force equal to the spring effect from the metal or the plastic material which is insufficient in most utilizations.

Moreover, self locking metallic closing means with a lever are known in which a hinged lever fixes a buckle relative to an anchoring means. The various different elements being separately machined and then assembled together through pivot connections or other devices subject to breakage, wear and corrosion.

The object of this invention is to provide a self locking clamping collar comprising an actuating lever, a buckle and anchoring means for such buckle wherein the lever is associated with one end of a split clamping ring and the buckle is associated with the other end of the ring. The different elements of the collar are formed from the same plastic material in a single injection moulding step and have between the elements, frangible connections and/or flexible filaments breakable in use or advantageously maintained as the case may be. The elements of the device interact through pivots which are integrally formed as part of various elements.

Other characteristics and advantages of the present invention will appear from the following description which was made by referring to the attached drawing in which.

Figure 1:
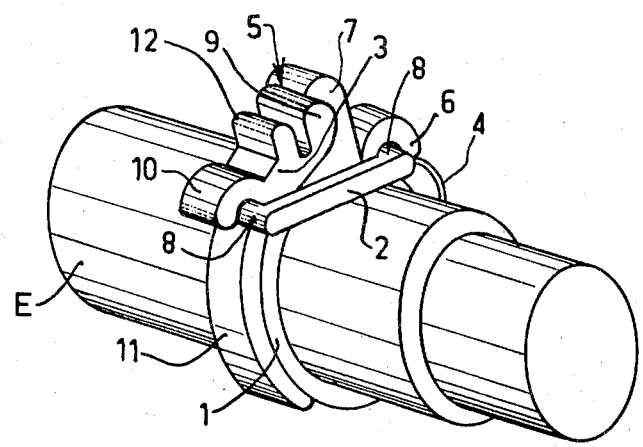
FIG. 1 is a perspective view of a clamping collar according to the invention in its closed position on a tube or sheath of a given diameter.
Figure 2:
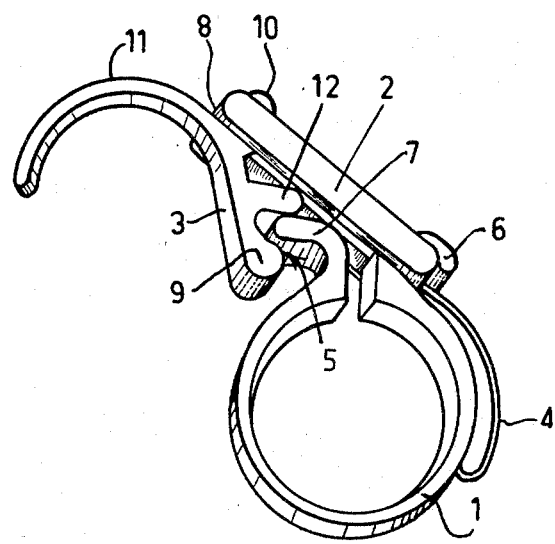
FIG. 2 is a perspective view of the same clamping collar in its opened position.

In the form of embodiment shown in FIGS. 1 and 2, a collar according to the invention has three parts moulded in a single injection step from suitable plastic material. The collar includes a split clamping ring 1, a prismatic buckle 2 and an actuating lever 3.

Preferably when the device is mouldable in a single injection step the prismatic buckle 2 is connected to the split clamping ring 1 by a filament 4. Ideally the device is designed so that the buckle can be positioned without destroying the filament. Attachment of the actuating lever 3 on split clamping ring 1 is obtained simply through a frangible connection point 5.

In another form of embodiment the buckle can be connected to the actuating lever by a supple filament produced by injection moulding instead of the filament 4 connecting said buckle to the split clamping ring.

Split clamping ring 1, designed so as to exert a clamping force as desired and having a predetermined diameter, comprises an anchoring bearing 6 at one end and a rotation bearing 7 at the other end.

The prismatic buckle 2 includes two anchoring axes 8.

The actuating lever 3 includes a rotation axis 9, an anchoring pin 10 and a control arm 11 as well as a supplementary pin 12.

The basic principle of utilization is the following:

Split clamp ring 1 is introduced around the element E to be clamped after being deformed. The prismatic buckle 2 connected to split clamping ring 1 through the connection filament 4 is snapped into the anchoring bearing 6 which is designed so as to receive accurately one of the two anchoring axes 8 of the prismatic buckle 2. As seen in FIG. 2, rotational motion of the control arm 11 breaks the frangible connection point 5 and the rotation axis 9 is positioned in the rotation bearing 7 while the anchoring pin 10 engages that anchoring axis 8 of the prismatic buckle 2 which was left free. In this position, referring again to FIG. 2, clockwise rotational motion of the control arm 11 tightens split clamping ring 1 around the element to be held. Rotation bearing 7 acts as a first pivot which acts in an overcenter manner relative to pivoting which occurs at the anchoring axes 8. As best seen in FIG. 2, the bearing 7 is below a line connecting the two axes 8 while, as seen in FIG. 1, the bearing 7 is above the line connecting the two axes 8. When the control arm 11 is in the position depicted in FIG. 1, it strongly applies itself against the outer face of split clamping ring 1 due to the tension produced by the prismatic buckle 2 between the anchoring bearing 6 and the anchoring pin 10, maintained there by the overcenter relationship of the pivot, to thereby ensure very reliable locking of the system.

The self locking of the collar was effected without the help of a tool in a very simple manner so as to obtain very reliable clamping. It is the tension of the prismatic buckle in its overcenter position which ensures that the clamping is safe and intensive.

As was noted above the connection filament 4 produced during the injection moulding is advantageously used for the presentation and fixation of one of the anchoring axes 8 of the prismatic buckle 2 in the anchoring bearing 6 of ring 1.

A supplementary pin 12 of the lever 3 resting on the outer portion of the end of ring 1 having the bearing 7 contributes to the positioning and engagement of the anchoring pin 10 of said lever on the other anchoring axis 8 of the prismatic buckle and the positioning of the rotation axis 9 of lever 3 in the bearing 7 of the ring.

Figure 3:
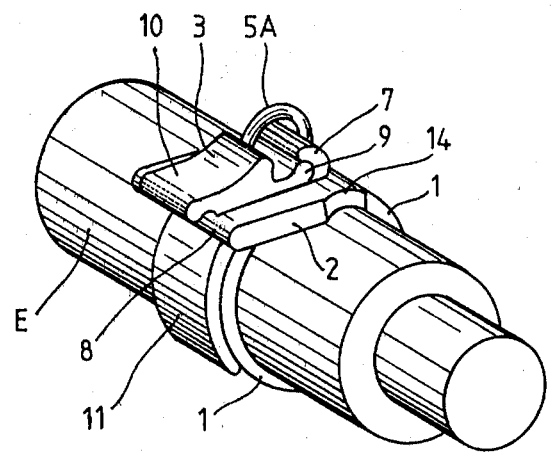
FIG. 3 is a view similar to FIG. 1 of another form of embodiment of a clamping collar, according to the invention, in its closed position on a tube or sheath.
Figure 4:
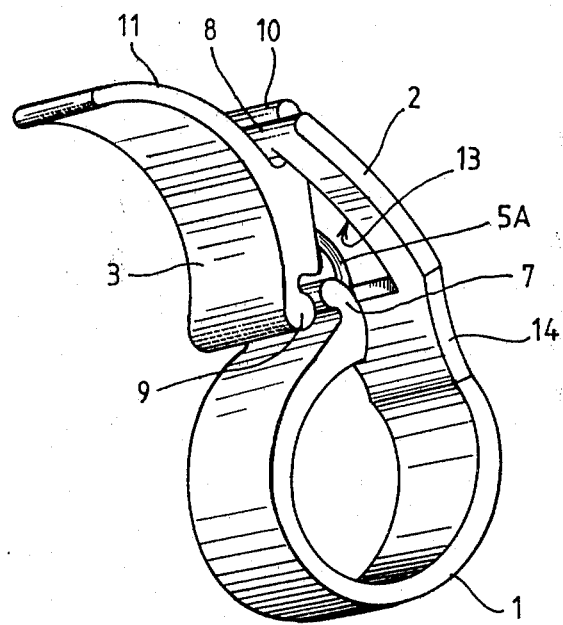
FIG. 4 is a perspective view of the clamping device shown in FIG. 3 in its open position.

In the form of embodiment shown in FIGS. 3 and 4 the prismatic buckle 2 is integrally formed with one end of split clamping ring 1.

A clamping collar according to this form of embodiment of the invention, i.e., as seen in FIGS. 3 and 4, is based on the same technical data and simplifies the positioning and the use thereof.

Split clamping ring 1 designed for clamping a part of a predetermined diameter with a desired amount of force comprises a rotation bearing 7 at one end and a buckle at the other end including a prismatic opening 13 limited by an anchoring axis 8.

A connection zone 14 integrally made with split ring 1 and the buckle 2 is substituted for the anchoring bearing 6 and the connection filament 4 of the embodiment of FIG. 1.

However, the frangible connection point 5 between the control lever 3 and split ring 1, of the embodiment of FIG. 1, is replaced by a connection filament 5A which compares with filament 4.

It will be understood that the present invention was only described and represented in exemplifying preferential forms of embodiment and that equivalent parts can be substituted for its constituents without departing from its scope as defined in the appended claims.

I claim:

1. An integrally formed self-locking clamping collar, of the type having an overcenter connecting assembly for a split clamping ring having a pair of relatively movable end portions adapted to be drawn and held proximate one another, comprising a split clamping ring having a pair of ends, a lever means, and a buckle means, one of said ends including pivot means for cooperating with said lever means, the other of said ends including a second pivot means adapted for cooperating with a buckle means, said lever means being adapted for drawing and locking said pair of ends proximate one another, said lever means including a bearing end adapted to cooperate with said first pivot means and anchoring means to cooperate with said buckle means, said buckle means including a first end adapted to cooperate with said second pivot means and a second end adapted to be engaged by said anchoring means of said lever means, flexible means attaching said buckle means to said split clamping ring to prevent loss thereof, frangible connecting means connecting said lever means to said split clamping ring whereby said self-locking clamping collar is initially a unitary device and subsequent to its first usage is a multi-part device, and whereby the locking of said clamping collar occurs when a pivot axis established by said bearing end and said first pivot means passes from one side of a line connecting a pivot axis established by said anchoring means and said second end and a pivot axis established by said first end and said second pivot means to the other side thereof.

2. An integrally formed self-locking clamping collar of the type having an overcenter connecting assembly for a split clamping ring having a pair of relatively movable end portions adapted to be drawn and held proximate one another, comprising a lever means for drawing and locking said pair of ends proximate one another, said lever means including a bearing end and anchoring means, a split clamping ring having a pair of ends, one of said ends including a first pivot means for cooperating with said bearing means of said lever means, the other of said ends including a second pivot means adapted to cooperate with said anchoring means, said second pivot means forming one end of a buckle means, flexible connecting means connecting said lever means to said split clamping ring whereby said split clamping ring and said lever means form a unitary self-locking clamping collar, and whereby the locking of said self-locking clamping collar occurs when a pivot axis established by said bearing end and said first pivot means passes from one side of a line passing through a pivot axis established by said anchoring means and said second pivot means to the other side thereof in an overcenter manner.

* * * * *